United States Patent
De Lorenzo et al.

(10) Patent No.: US 8,872,698 B2
(45) Date of Patent: Oct. 28, 2014

(54) APPARATUS AND METHOD FOR MEASURING SPATIAL MOVEMENTS OF PLANT STRUCTURES

(75) Inventors: Gianpietro De Lorenzo, Segrate (IT); Giuseppe Giunta, San Donato Milanese (IT)

(73) Assignee: ENI S.p.A., Rome (IT)

( * ) Notice: Subject to any disclaimer, the term of this patent is extended or adjusted under 35 U.S.C. 154(b) by 544 days.

(21) Appl. No.: 13/203,380

(22) PCT Filed: Feb. 18, 2010

(86) PCT No.: PCT/EP2010/001097
§ 371 (c)(1),
(2), (4) Date: Nov. 8, 2011

(87) PCT Pub. No.: WO2010/099881
PCT Pub. Date: Sep. 10, 2010

(65) Prior Publication Data
US 2012/0044106 A1 Feb. 23, 2012

(30) Foreign Application Priority Data
Mar. 4, 2009 (IT) .............................. MI2009A0315

(51) Int. Cl.
| | | |
|---|---|---|
| *G01S 19/42* | (2010.01) | |
| *H01Q 1/18* | (2006.01) | |
| *H01Q 1/12* | (2006.01) | |
| *G01M 5/00* | (2006.01) | |
| *G01S 19/43* | (2010.01) | |
| *G01S 13/76* | (2006.01) | |
| *G01S 19/14* | (2010.01) | |
| *G01S 13/90* | (2006.01) | |

(52) U.S. Cl.
CPC .............. *G01M 5/0058* (2013.01); *G01S 19/43* (2013.01); *H01Q 1/18* (2013.01); *G01S 13/767* (2013.01); *H01Q 1/125* (2013.01); *G01S 19/14* (2013.01); *G01S 13/9023* (2013.01)
USPC ..................................................... 342/357.25

(58) Field of Classification Search
USPC ..................................................... 342/357.25
See application file for complete search history.

(56) References Cited

U.S. PATENT DOCUMENTS

| | | | |
|---|---|---|---|
| 4,599,620 A | * | 7/1986 | Evans ...................... 342/357.36 |
| 5,512,912 A | | 4/1996 | Ross et al. |

(Continued)

FOREIGN PATENT DOCUMENTS

| | | |
|---|---|---|
| DE | 100 62 795 | 2/2002 |
| EP | 1 688 759 | 8/2006 |

(Continued)

OTHER PUBLICATIONS

International Search Report Issued Jun. 9, 2010 in PCT/EP10/001097 filed Feb. 18, 2010.

*Primary Examiner* — Harry Liu
(74) *Attorney, Agent, or Firm* — Oblon, Spivak, McClelland, Maier & Neustadt, L.L.P.

(57) ABSTRACT

An apparatus and method for measuring spatial movements of plant structures, such as pipes, due for example to movement of the ground in presence of landslide phenomena, subsidence, collapse, or differential settling. The measuring apparatus includes at least one ground station that communicates with at least one corresponding signal-sending satellite station, the ground station being connected in a movable manner to a support constrainable in a fixed manner to the plant structure, the ground structure having an initial azimuthal orientation and an initial azimuthal height. The ground station is moved with respect to the support via a mechanism for adjusting the orientation and height of the same to compensate for an instantaneous orientation and height that are different from the initial orientation and height.

20 Claims, 6 Drawing Sheets

(56) References Cited

U.S. PATENT DOCUMENTS

| | | | |
|---|---|---|---|
| 5,594,953 A | 1/1997 | Ross et al. | |
| 5,915,476 A * | 6/1999 | Hubbell et al. | 166/113 |
| 5,922,039 A | 7/1999 | Welch et al. | |
| 6,844,856 B1 | 1/2005 | Wright | |
| 2002/0196195 A1 | 12/2002 | Vermette et al. | |
| 2004/0233096 A1 | 11/2004 | Russo et al. | |
| 2007/0195645 A1 * | 8/2007 | Laake | 367/68 |
| 2008/0204315 A1 | 8/2008 | Caporali | |
| 2009/0121914 A1 | 5/2009 | Arnaud | |

FOREIGN PATENT DOCUMENTS

| | | |
|---|---|---|
| JP | 2008 175675 | 7/2008 |
| WO | 02 101410 | 12/2002 |
| WO | 2006 112637 | 10/2006 |
| WO | 2007 077169 | 7/2007 |

* cited by examiner

APPARATUS AND METHOD FOR MEASURING SPATIAL MOVEMENTS OF PLANT STRUCTURES

The present invention relates to an apparatus and method for measuring spatial movements of plant structures, such as pipes, due for example to ground movements in the presence of landslide phenomena, subsidence, collapse or differential settling.

In the field of low- or high-pressure fluid transportation, for example, such as gas, oil or water, it is important to monitor the pipes specifically used for evaluating the stress to which they have been subjected following landslides or, more generally, subsidence of the land.

These situations can generate a pressure or tensioning on the structure or a deformation of the same capable of leading to breakages, for example of the welds.

A monitoring of the spatial movements in these structures therefore allows a prediction to be made of the risk of fracture of the same.

In the field of evaluation of ground movement, and consequently of structures integral with the same, it is known for example to adopt satellite positioning systems, such as for example the GPS system (Global Positioning System), the GLONASS system or Galileo system.

Differential satellite positioning systems also known as DGPS are preferably used, which, in addition to a high precision in horizontal measurements (coordinates x and y), also offer an increased reliability of height measurements (coordinate z) with respect to simple GPS systems, allowing them to be independent of the influence that the passage of the satellite signal through the atmosphere can have on the same.

A DGPS system comprises two ground receivers of signals transmitted by a plurality of satellites forming part of the known satellite positioning systems (GPS, Glonass or Galileo) of which a first receiver acts as reference, whereas the second is called "rover".

On the basis of the difference in the measurements effected by the two receivers, it is possible to determine the tilted distance between the same and the residual errors from which, once the three-dimensional coordinates x, y and z of the reference receiver are known, it is possible to obtain the three-dimensional coordinates of the rover receiver, error-free.

In this way, it is possible to obtain a metric or centimetric accuracy depending on whether or not the phase is also used for the calculation of the difference.

In practical situations between the two receivers and satellite, there can be obstacles such as trees, buildings, mountains and so forth. Furthermore, the quality of the signal can also deteriorate due to interferences, caused for example by the presence of power lines or antennas.

The orientation of the receivers with respect to the satellites is consequently particularly important, in order to guarantee that the transmission of the signal is optimum also in the presence of obstacles or interferences.

Modern satellite positioning instruments allow a minimum cut-off angle to be set which enables the tracking of low satellites to be blacked out, which are most widely affected by problems relating to disturbance of the signal due to the atmosphere.

By renouncing the availability of some satellites, however, there is a reduction in the survey accuracy, in particular with reference to the height measurement (coordinate z).

A further technique currently known for measuring the movement of the ground and structures integral therewith is differential radar interferometry. This technique is based on the measurement of the phase difference of two radar signals relating to the same point, each sent from a satellite at one of its passages, and backscattered from the ground.

From this measurement, it is possible to deduce, with a high accuracy, a movement along the vertical (coordinate z) which has taken place between two passages of the satellite and, in some cases, also horizontal movements (coordinates x, y).

Considering that satellite passages normally take place every 35 days approximately, it is evident that this technique is useful for measurements of slow movement phenomena, such as for example subsidence or slow landslides.

This technique processes the radar data obtained through SAR (Synthetic Aperture Radar) systems which comprise signal emission means and a sensor assembled on the satellite. The emission means used in SAR systems transmit signals towards the earth having a frequency within the microwave range, whereas the sensor is used for collecting the complex backscattering of the signals transmitted, generated from the ground level.

The radar signal phase transmitted from the SAR system and backscattered from the ground level, is proportional to the distance between the satellite and the ground point in which the backscattering takes place. Consequently, a phase difference between two SAR images of the same area, acquired at different instants, is directly associated with a lowering or raising of the object of the image which has occurred in the interval between the first and second instant of acquisition.

An evolution of differential radar interferometry envisages the preventive identification through statistic analysis of a plurality of points with an optimized backscattering and capable of preserving the reflection characteristics with time, on the basis of which the subsidence measurements should be effected.

The measurements effected on the single point thus identified, so-called permanent backscatterers, allows movement phenomena to be revealed along the vertical (coordinate z) in the order of millimeters.

With a high spatial density of permanent backscatterers it is also possible to obtain good results also in horizontal measurements (coordinates x and y) of the ground and/or structures installed with time.

In the case of the scarcity of natural permanent backscatterers, it is well-known to install specific artificial permanent backscatterers, of the passive or active type, distributed in the area of interest.

Artificial backscatterers of the passive type have the characteristic of having a low cost and not necessitating particular maintenance, but have the disadvantage of requiring considerable size and of being sensitive to the orientation towards the satellite.

Consequently, at the moment of installation, the backscatter must be very accurately oriented with respect to the satellite selected and are exclusively destined for reflection of the signal transmitted by that precise satellite.

Active backscatters, on the other hand, are compact systems characterized by reduced dimensions which make them easy to anchor to the ground and transport to the site.

These backscatters have the advantage of not requiring an accurate directional orientation and of being sensitive to more than one satellite, even if with a precise orientation they operate under better conditions.

In conclusion, the techniques currently known require a precise positioning which is stable with time, of the relative ground stations (i.e. the backscatterers and terrestrial receivers) to be able to operate.

Once the backscatters, both active and passive, of differential radar interferometry, as also DGPS receivers, have been installed in the monitoring area, they are subject to possible morphological alteration and alteration due to anthropic presence on the earth.

The evaluation systems of movements of the ground and structures installed discussed so far are consequently not capable of maintaining with time the degree of accuracy offered at the moment of installation.

If these backscatters and terrestrial reflectors are installed integral with the plant structure to be monitored, for example by welding or gluing with resins, there is a reduced problem of an alteration on the part of human beings or animals or atmospheric phenomena of a high intensity.

Also in this case, however, the system is not able to maintain over time the precision degree offered at the moment of installation as even a slight spatial movement of the structure, due to a settling of the land, can cause a non-optimum positioning of the ground stations with respect to the satellites thus jeopardizing the detection capacity of the system.

Objective of the present invention is to overcome the drawbacks described above and in particular to conceive an apparatus and method for measuring spatial movements of plant structures which are capable of maintaining with time the measurement precision offered at the moment of installation.

A further objective of the present invention is to provide an apparatus and method for measuring spatial movements of plant structures which are scarcely subject to alterations due to anthropic presence on the earth or atmospheric phenomena of a high intensity.

Another objective of the present invention is to provide an apparatus and method for measuring spatial movements of plant structures which are capable of guaranteeing a submillimetric precision in the measurements effected.

These and other objectives according to the present invention are achieved by providing an apparatus and method for measuring spatial movements of plant structures as specified in the independent claims.

Further characteristics of the apparatus and method for measuring spatial movements of plant structures are object of the dependent claims.

The characteristics and advantages of an apparatus and method for measuring spatial movements of plant structures according to the present invention will appear more evident from the following illustrative and non-limiting description, referring to the enclosed schematic drawings in which.

Figure 1:
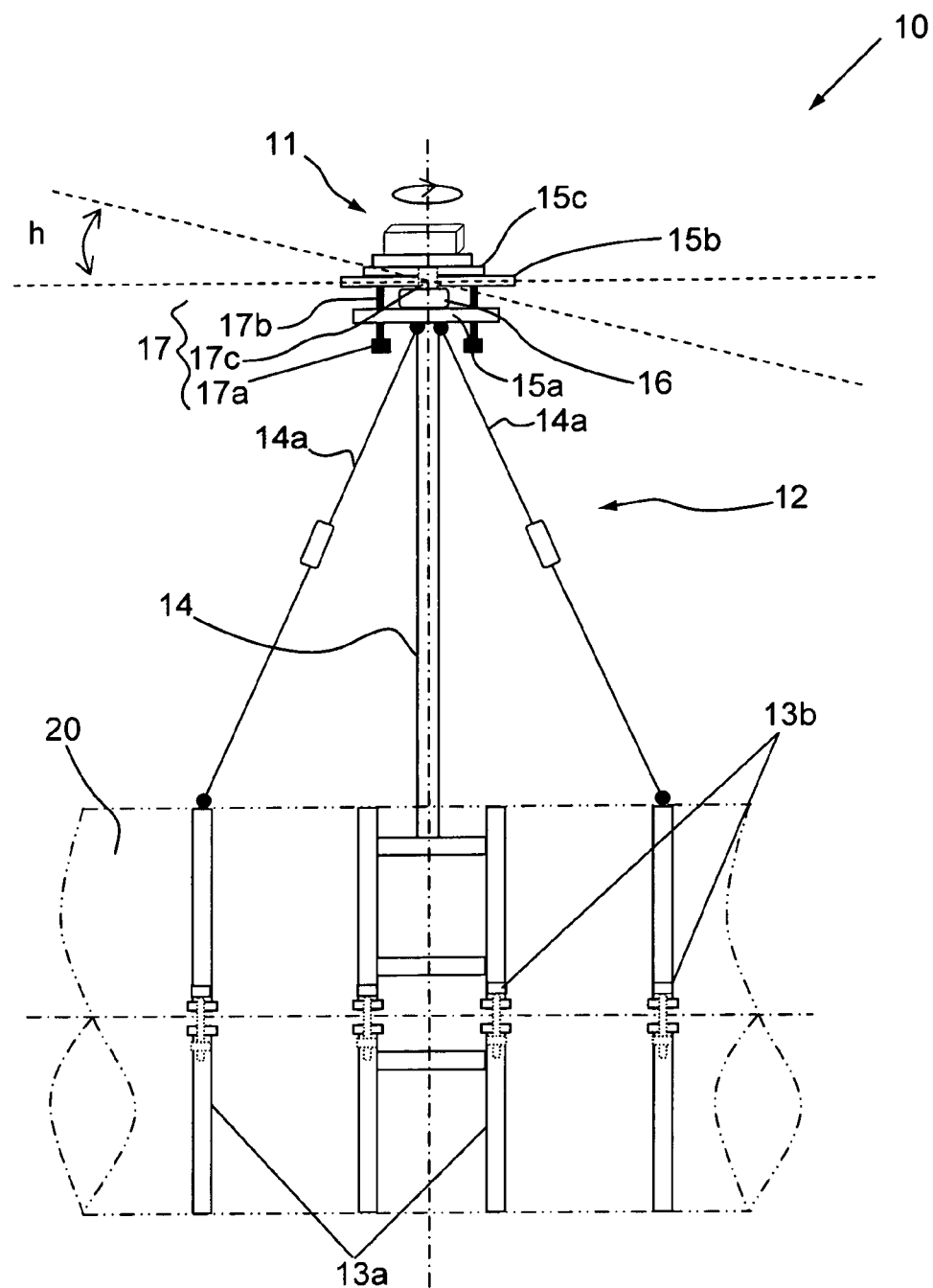
FIG. 1 is a side elevation view of a first embodiment of a measuring apparatus of spatial movements of plant structures according to the present invention.
Figure 2:
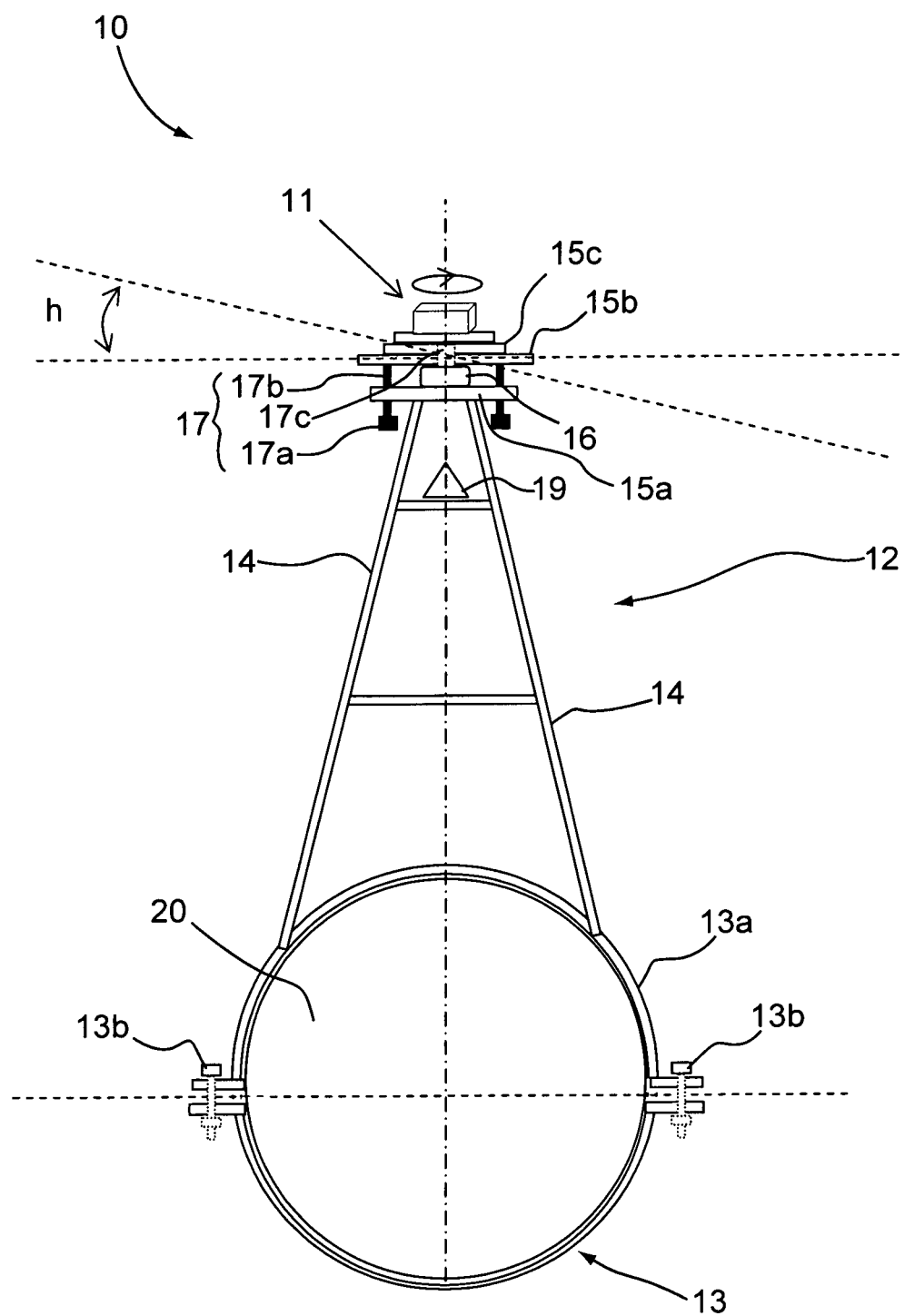
FIG. 2 is a raised front view of the measuring apparatus of spatial movements of plant structures of FIG. 1.
Figure 3:
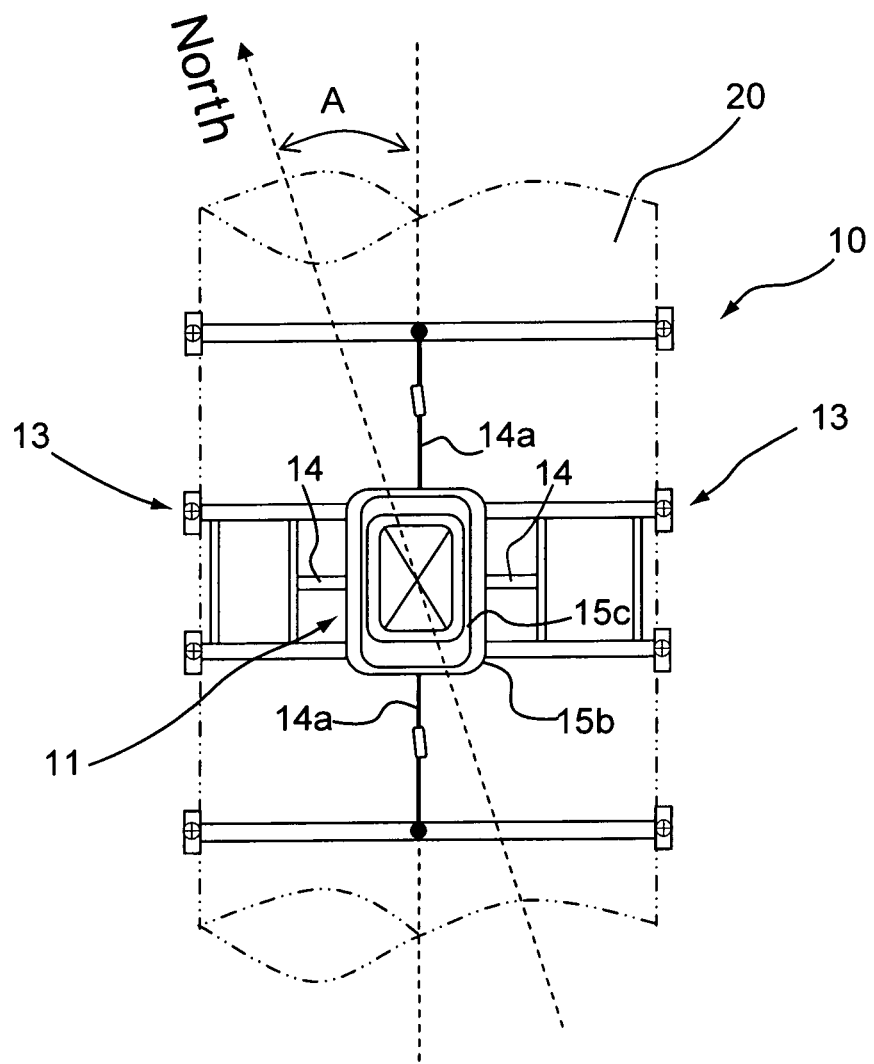
FIG. 3 is a plan view of the measuring apparatus of spatial movements of plant structures of FIG. 1.
Figure 4:
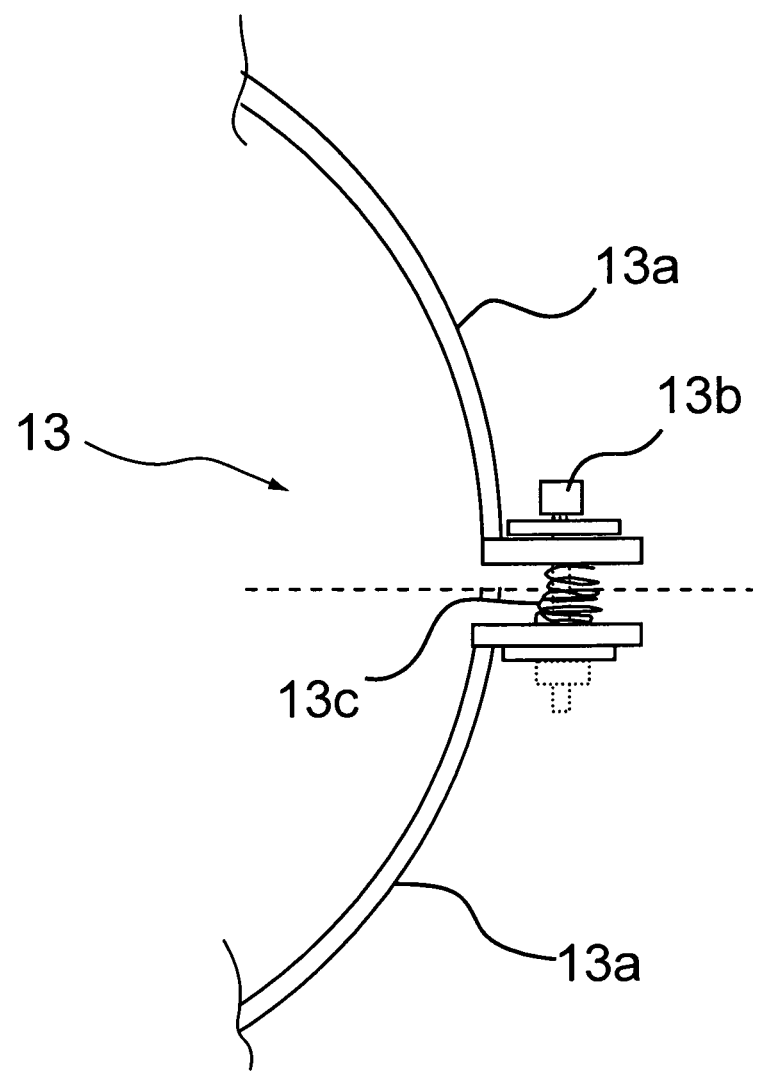
FIG. 4 is a detail of the measuring apparatus of spatial movements of plant structures of FIG. 1.

With reference to the figures, these show an apparatus for measuring spatial movements of plant structures according to the present invention, indicated as a whole with 10.

For these measurements, systems consisting of one or more measuring apparatuses 10 according to the present invention are generally used, which communicate with at least one corresponding signal-sending satellite station.

For this purpose, the measuring apparatus 10 comprises at least one ground station 11 capable of communicating with the signal-sending satellite station.

According to the technology used, the at least one ground station 11 is a satellite positioning receiver (GPS, Glonass or Galileo) 11b used within the area of DGPS surveys and/or an artificial backscatter 11a of a satellite radar signal used in the field of SAR differential interferometry.

Analogously, according to the technology used, the at least one signal-sending satellite station is respectively a satellite belonging to satellite positioning systems (GPS, Glonass or Galileo) or, in addition, a satellite equipped with means capable of emitting signals within the microwave range used in SAR differential interferometry.

Preferably, in the case of SAR differential interferometry, artificial backscatter 11a of the active type are used, which require reduced encumbrances thus also allowing a simpler anchorage to a plant structure 20 positioned in the ground.

According to the present invention, the ground station 11 is adjustably constrained to a support 12 which can be connected in a fixed manner to the plant structure 20.

In the embodiment illustrated, the support 12 consists of coupling elements 13 to the structure 20 on which a plurality of substantially vertical bars 14 is assembled, equipped with elastic compensators 14a and joined above to a first platform 15a.

In the case of a cylindrically shaped plant structure 20, the coupling means 13 to the structure 20 are preferably produced by means of two pairs of semicircular bands 13a made of a slightly elastic material joined to each other by adjustable connection means 13b and provided with elastic compensators 13c.

At least one ground station 11 is preferably integrally constrained above to a second platform 15b which acts as support surface for the ground station 11 or as a support for a specific support surface 15c. This support surface 15b, 15c is in turn connected to the first platform 15a of the support 12 by the regulation means 17 of the azimuthal orientation and height capable of modifying the mutual positioning between the support surface 15b, 15c and the first platform 15a.

For an automatic regulation of the mutual positioning between the ground station 11 and the support 12, detection means 16 are envisaged, of the instantaneous azimuthal coordinates, i.e. of the azimuthal orientation A and height h of the first platform 15a and therefore of the structure 20 to which the first platform 15a is integrally constrained through the bars 14 and coupling means 13.

Said detection means 16 of the azimuthal coordinates comprise at least one slope detection device or tiltmeter and a rotation gauge for detecting the height h and the Azimuth A respectively of the first platform 15a with respect to an inclination and an initial rotation angle defined at the moment of implementation of the measurement apparatus 10.

The tiltmeter and rotation gauge are connected to data processing means 19, preferably provided with a radio transmitter which, on the basis of the height h and instantaneous azimuthal orientation A revealed generate a command signal for the adjustment means 17, and in particular for at least a first electromechanical actuator 17a capable of varying the inclination and for at least a second electromechanical actuator 17c capable of varying the rotation of the support surface 15b, 15c with respect to the first platform 15a and therefore with respect to the structure 20.

The electromechanical actuators 17a and 17c are preferably step-by-step motors which respectively act on the movement means 17b of the support surface 15b, 15c, or directly on said support surface 15b, 15c.

The movement means 17b are for example worm screws integrally connected to the support surface 15b, 15c. By modifying the screw degree of the single worm screws 17b to the first platform 15a, it is possible to modify the inclination of the support surface 15b, 15c of the ground station 11 with respect to said first platform 15a, thus compensating a variation in the azimuthal height h of the structure 20.

A compensation of the rotation of the support surface 15b, 15c, on the other hand, occurs directly through the actuator 17c.

This consequently ensures that, should the structure 20 undergo spatial movements which could modify the inclination and rotation of the support surface 15b, 15c, and therefore the at least one ground station 11, with respect to the positioning defined in the installation phase, these variations are compensated by an appropriate movement imposed on the support surface 15b, 15c by the adjustment means 17, thus maintaining the orientation of the ground station 11 towards the satellite stations, unaltered.

Figure 5:
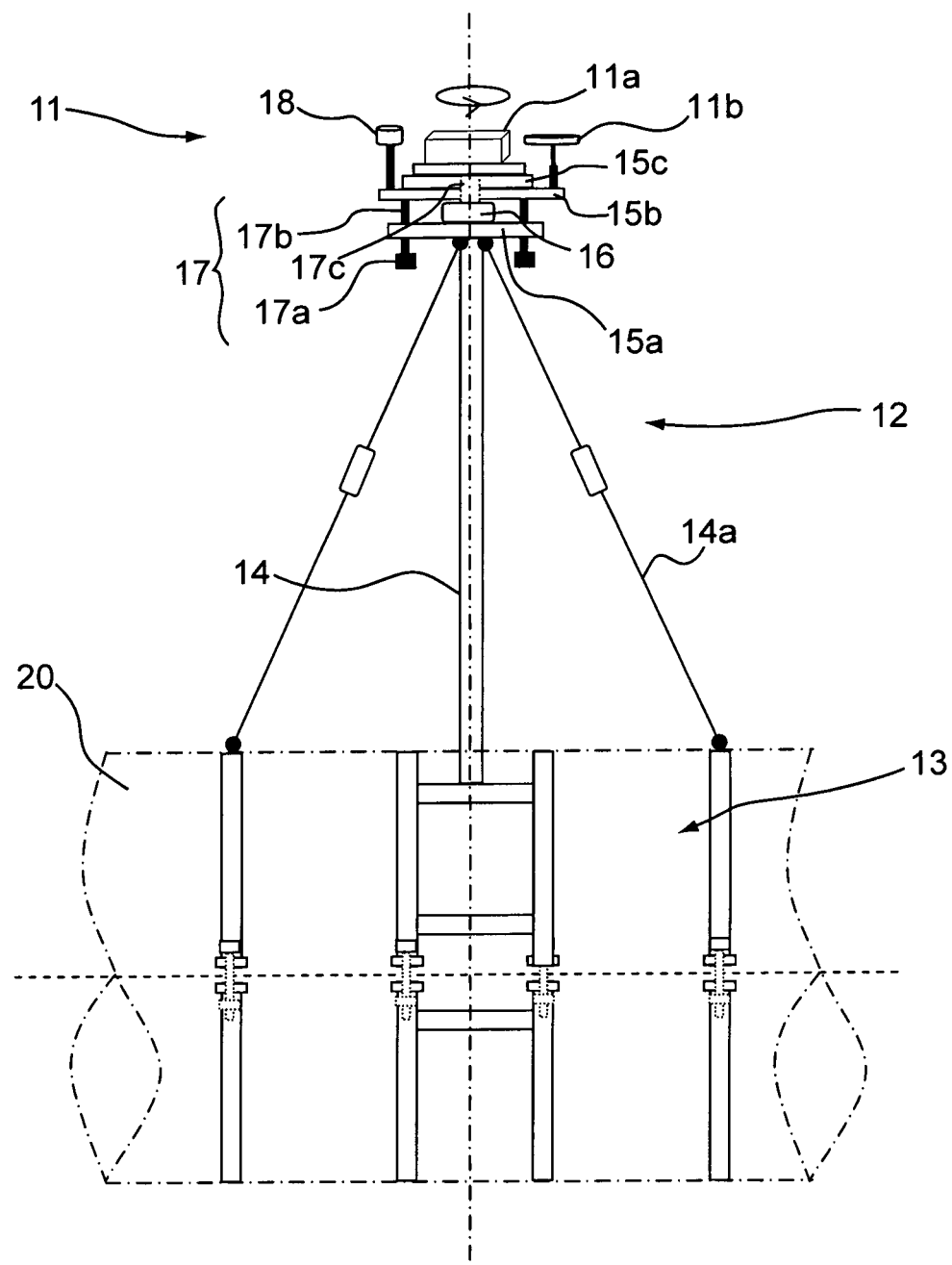
FIG. 5 is a second embodiment of a measuring apparatus of spatial movements of plant structures according to the present invention.
Figure 6:
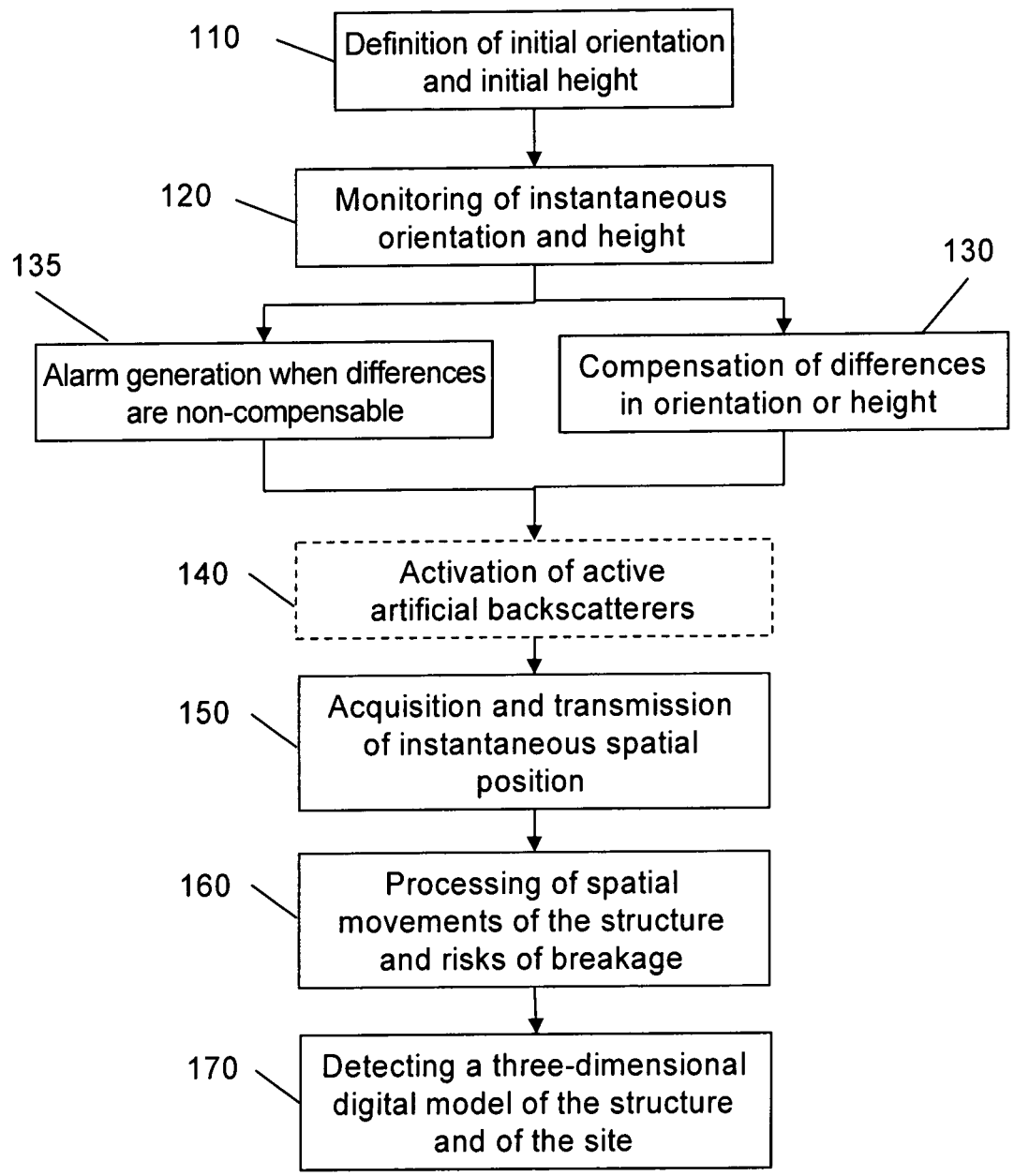
FIG. 6 is a block scheme of the measurement method of spatial movements of plant structures according to the present invention.

The measurement apparatus 10 of spatial movements of plant structures preferably comprises both an active artificial backscatter 11a of a satellite radar signal used within the field of SAR differential interferometry, and also a satellite positioning receiver 11b as shown in FIG. 5.

Measurement campaigns effected by the Applicant have shown in fact that the combination of observations effected by the two technologies, DGPS and SAR differential interferometry, lead to a sub-millimetric precision degree of spatial movements.

The measurement apparatus 10 of spatial movements of plant structures most preferably also additionally comprises a device 18 capable of reflecting a laser beam used within the area of a geometrical survey of the laser scanning type.

This allows high spatial precision to be obtained when a three-dimensional digital model of the structure 20 is required, obtained by means of various adjacent scans effected with the laser scanning technique.

The method 100 for measuring spatial movements of plant structures is the following.

At the moment of installation of the measurement apparatus 10 on the structure 20, an initial azimuthal orientation $A_0$ and an initial height $h_0$ of the support surface 15b, 15c, are defined 110.

In particular, the initial azimuthal orientation $A_0$ coincides with the rotation angle of the surface 15b, 15c in which the electronics of the backscatter 11a is oriented towards the cardinal point north.

The initial height $h_0$, on the other hand, coincides with an arrangement of the support surface 15b, 15c which is perfectly parallel to the surface of the sea.

During the whole survey period there is a constant monitoring 120 of the instantaneous orientation A and height h.

If the instantaneous orientation and height values revealed differ from those initially established, the processing means 19 pilot 130 the actuators 17a, 17c so as to compensate these differences.

This ensures that the ground station 11 is always capable of correctly and accurately receiving/backscattering the signals sent from the respective transmitting station.

If the orientation and height values detected exceed the maximum predefined values $A_{max}$ and $h_{max}$, depending on the type of actuator 17a, 17c and movement means 17b used, an alarm signal is generated and transmitted 135 to a data collection centre, for example through the radio transmitter present in the processing means 19, which notifies the impossibility of a further compensation.

In this case, it must be asserted whether the spatial movement to which the structure 20 has been subjected, is such as to damage it, therefore requiring an intervention on the same 20, or if a maintenance intervention is sufficient for restoring the optimum communication conditions of the at least one ground station 11 with the satellite.

During the whole survey period, there is also the acquisition 150 of the instantaneous spatial position x, y, z through the DGPS and/or SAR differential interferometry technologies used and the transmission of the data revealed at the data collection centre. In particular, if both technologies are used, the horizontal coordinates x, y are accurately revealed through the DGPS technology. SAR differential interferometry, on the other hand, offers a more accurate indication of the vertical coordinate z.

For energy saving purposes, the artificial backscatterers 11a of the active type are preferably held dormant and are only switched on 140 in correspondence with the passage of the satellite in which the respective radar signal sending station is assembled.

On the basis of the position data collected, a processing takes place 160 of the spatial movements to which the structure 20 has been subjected in order to determine the mechanical stress which it has undergone and also the risk of breakage of the same 20.

According to the embodiment adopted, a three-dimensional digital model of the structure 20 and installation site of the same is also revealed 170 through the laser scanning technique.

For this purpose at least three measuring devices, each comprising a good reflection element 18, are stationed along the plant structure 20 so that they are in common with the point clouds of consecutive scans.

The characteristics of the measurement apparatus and method object of the present invention are evident from the above description, as well the relative advantages.

Finally, numerous modifications and variants can obviously be applied to the measurement apparatus and method thus conceived, all included in the invention; furthermore, all the details can be substituted by technically equivalent elements. In practice, the materials used, as also the dimensions, can vary according to technical application requirements.

The invention claimed is:

1. An apparatus for measuring spatial movements of a plant structure comprising:
   at least one ground station that communicates with at least one corresponding signal-sending satellite station, the ground station being connected in a movable manner to a support constrainable in a fixed manner to the plant structure, the ground structure having an initial azimuthal orientation and an initial azimuthal height,
   wherein the ground station is moved with respect to the support via a mechanism to adjust an orientation and height of the ground station so as to compensate for an instantaneous orientation and height that are different from the initial orientation and height,
   wherein the ground station is integrally constrained on an upper part to a support surface and the support comprises a first platform to which the support surface is connected, the mechanism to adjust the orientation and height of the ground station modifying mutual positioning between the support surface and the first platform, and wherein the mechanism comprises at least a first actuator connected to a plurality of worm screws constrained in a rotatable manner to the first platform and integral with the support surface, and at least a second actuator configured to rotate the support surface.

2. An apparatus for measuring spatial movements of a plant structure according to claim 1, further comprising a detector to detect azimuthal orientation and height of the support comprising at least one slope detection device and one rotation gauge, the detector that detects azimuthal orientation and height being connected to signal processing circuitry to process an actuation signal of the mechanism based on the instantaneous detected orientation and height.

3. An apparatus for measuring spatial movements of a plant structure according to claim 1, wherein the ground station is a satellite positioning receiver.

4. An apparatus for measuring spatial movements of a plant structure according to claim 1, wherein the ground station is an artificial backscatter diffusing an electromagnetic signal coming from a satellite.

5. An apparatus for measuring induced spatial movements of a plant structure according to claim 4, wherein the backscatter is of active type.

6. An apparatus for measuring spatial movements of a plant structure according to claim 1, wherein the support surface is constrained to a device reflecting a laser beam.

7. An apparatus for measuring spatial movements of a plant structure according to claim 1, wherein the support comprises a plurality of coupling elements coupled to the plant structure, a plurality of bars joined on the upper part of the first platform being mounted on the coupling elements.

8. An apparatus for measuring spatial movements of a plant structure according to claim 7, wherein the coupling elements coupled to the plant structure include two pairs of semicircular bands joined together by adjustable connectors.

9. A method for measuring spatial movements of plant structures comprising:
defining an initial orientation and an initial height of at least one ground station constrained to the plant structure and communicating with at least one corresponding satellite signal sending station for detection of a spatial position of the plant structure;
monitoring an instantaneous orientation and the height of the plant structure;
varying the orientation and height of the at least one ground station so as to compensate for an instantaneous orientation and height that are different from the initial orientation and height;
acquiring and transmitting an instantaneous spatial position of the plant structure; and
processing a spatial movement of the plant structure based on the instantaneous spatial position.

10. A method for measuring spatial movements of plant structures according to claim 9, further comprising generating and transmitting an alarm signal in a case the instantaneous orientation and height are greater than respective maximum orientation and maximum height values.

11. A method for measuring spatial movements of plant structures according to claim 9, further comprising turning on the ground station at passage of the at least one signal-sending satellite station, if the at least one ground station is an artificial backscatter of active type, the at least one signal-sending satellite station comprising a radar signal transmission satellite.

12. A method for measuring spatial movements of plant structures according to claim 9, further comprising detecting a three-dimensional digital model of the plant structure and of an installation site of the plant structure.

13. An apparatus for measuring spatial movements of a plant structure comprising:
at least one ground station that communicates with at least one corresponding signal-sending satellite station, the ground station being connected in a movable manner to a support constrainable in a fixed manner to the plant structure, the ground structure having an initial azimuthal orientation and an initial azimuthal height,
wherein the ground station is moved with respect to the support via means for adjusting an orientation and height of the ground station so as to compensate for an instantaneous orientation and height that are different from the initial orientation and height,
wherein the ground station is integrally constrained on an upper part to a support surface and the support comprises a first platform to which the support surface is connected, the means for adjusting the orientation and height of the ground station modifying mutual positioning between the support surface and the first platform, and
wherein the adjustment means comprises at least a first means for actuating connected to a means for moving constrained in a rotatable manner to the first platform and integral with the support surface, and at least a second means for actuating configured to rotate the support surface.

14. An apparatus for measuring spatial movements of a plant structure according to claim 13, further comprising means for detecting azimuthal orientation and height of the support comprising at least one slope detection device and one rotation gauge, the means for detecting the azimuthal orientation and height being connected to signal processing means for processing an actuation signal of the adjustment means based on the instantaneous detected orientation and height.

15. An apparatus for measuring spatial movements of a plant structure according to claim 13, wherein the ground station is a satellite positioning receiver.

16. An apparatus for measuring spatial movements of a plant structure according to claim 13, wherein the ground station is an artificial backscatter diffusing an electromagnetic signal coming from a satellite.

17. An apparatus for measuring induced spatial movements of a plant structure according to claim 16, wherein the backscatter is of active type.

18. An apparatus for measuring spatial movements of a plant structure according to claim 13, wherein the support surface is constrained to a device reflecting a laser beam.

19. An apparatus for measuring spatial movements of a plant structure according to claim 13, wherein the support comprises means for coupling to the plant structure, a plurality of bars joined on the upper part of the first platform being mounted on the coupling means.

20. An apparatus for measuring spatial movements of a plant structure according to claim 19, wherein the means for coupling to the plant structure includes two pairs of semicircular bands joined together by adjustable means for connecting.

* * * * *